Nov. 22, 1955 F. M. BROCK 2,724,777

AMPLITUDE-STABILIZED CRYSTAL OSCILLATOR

Filed Oct. 20, 1954

INVENTOR.
FRANK M. BROCK
BY G. A. Rechif
AGENT 2,724,777

AMPLITUDE-STABILIZED CRYSTAL OSCILLATOR

Frank M. Brock, Haddonfield, N. J., assignor to Radio Corporation of America, a corporation of Delaware Application October 20, 1954, Serial No. 463,381
10 Claims. (Cl. 250—36)

This invention relates to a crystal oscillator, and more particularly to an improved oscillator based on the so-called Pierce oscillator.

An object of this invention is to reduce the harmonic content of the output of a so-called Pierce oscillator.

Another object is to increase the amplitude stability of the output of a so-called Pierce oscillator.

A further object is to devise a novel type of crystal oscillator.

The objects of this invention are accomplished, briefly, in the following manner: In a Pierce crystal oscillator including a vacuum tube which is self-biased through the agency of a cathode resistance, a portion of the A. C. voltage across this resistance is rectified, filtered and the resulting D. C. is applied to the grid of the oscillator tube with such a polarity as to oppose the normally high negative bias of the tube. In this way, the tube, which would in the absence of this invention be operating class C, is constrained to operate toward the class B limit.

Figure 1:
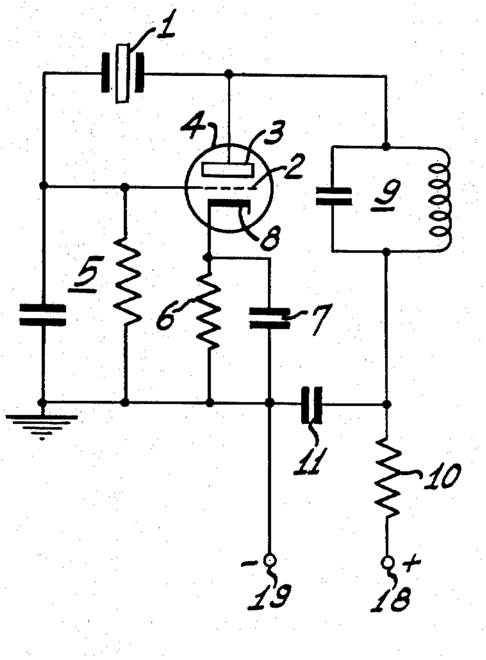
Figure 2:
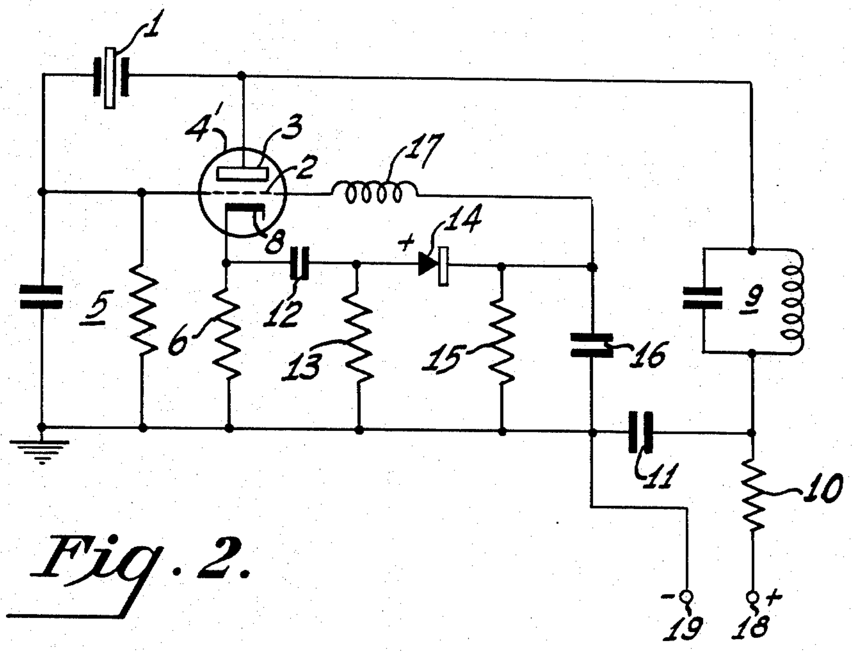

The foregoing and other objects of the invention will be better understood from the following description of an exemplification thereof, reference being had to the accompanying drawing, wherein:

Fig. 1 is a schematic circuit diagram of a conventional crystal oscillator of the so-called Pierce type; and Fig. 2 is a schematic circuit diagram of a crystal oscillator according to this invention.

Referring now to Fig. 1, this figure is a schematic circuit diagram of a crystal oscillator of the so-called Pierce type, in which a piezoelectric crystal 1 is connected between the grid 2 and anode 3 of a triode vacuum tube 4. A parallel resistance-capacitance network 5 is connected between the grid 2 and ground or a point of fixed reference potential. The oscillator in Fig. 1 is self-biased, and for this purpose a network, comprising a resistor 6 and a capacitor 7 connected in parallel, is connected between the cathode 8 of tube 4 and ground. One side of a parallel resonant output tank circuit 9 is connected to the anode 3, and the other side of this circuit is connected through a resistor 10 to the positive terminal 18 of a unidirectional anode potential source, the negative terminal 19 of which is grounded. A capacitor 11 is connected between the common junction of network 9 and resistor 10, to ground.

The oscillator of Fig. 1 (the so-called Pierce oscillator) will oscillate only when the anode load is capacitive, and therefore the natural resonant frequency of the resonant circuit 9 must be slightly lower than that of the crystal 1.

The self-biased oscillator circuit of Fig. 1 will normally operate with a self-developed bias potential (developed across the resistor 6) such that the tube 4 operates class C, that is, the conditions of operation are such that the grid bias is appreciably greater than the cutoff value, so that the anode current is zero when no alternating grid voltage is applied and anode current flows for appreciably less than one-half of each cycle when an alternating grid voltage is applied. In other words, in Fig. 1 there is normally developed a rather high negative grid bias voltage for tube 4. Class C operation entails rather high distortion of the output waveform of the oscillator (that is, high harmonic content of such output), but higher efficiency than class A or class B operation.

Referring now to Fig. 2, which is a schematic circuit diagram of an arrangement according to this invention, it may be seen that the crystal oscillator itself is essentially of the so-called Pierce type, and is similar to Fig. 1 in that the crystal 1 is connected between the grid 2 and anode 3 of the triode vacuum tube 4', the RC network 5 is connected between the grid 2 and ground, and positive unidirectional anode potential is supplied to anode 3 by way of resistor 10 and the parallel resonant output or tank circuit 9.

In Fig. 2, the oscillator is again self-biased by means of a resistor 6 connected between cathode 8 and ground. However, in Fig. 2 the resistor 6 is unbypassed and a D. C. feedback path is provided between cathode 8 and grid 2. A portion of the A. C. voltage developed across resistor 6 is coupled by way of a capacitor 12 (one terminal of which is connected to the ungrounded or cathode end of resistor 6) and a resistor 13 (which is connected between the other terminal of capacitor 12 and ground) to a rectifier 14, which for example may be of the germanium diode type. The rectifier 14, in conjunction with a load resistor 15 and a filter capacitor 16, which are both connected between ground and that terminal of rectifier 14 which is farthest removed from capacitor 12, will produce a D. C. voltage across resistor 15 which is proportional to the A. C. voltage across resistor 6. The rectifier 14 is connected with such a polarity that the D. C. voltage developed across resistor 15 opposes the normally high negative grid bias voltage of the tube 4'. This is indicated by the plus sign adjacent that terminal of rectifier 14 which is nearest to capacitor 12.

The D. C. voltage developed across resistor 15 is coupled to the grid 2 of tube 4' by means of a radio frequency choke 17 which presents a high impedance to the A. C. voltage on grid 2, thus effectively preventing the A. C. from leaking to earth through the D. C. feedback path, which includes resistor 15.

As previously described, the conventional self-biased oscillator circuit of Fig. 1 will normally operate to develop a high negative grid bias such that the vacuum tube 4' operates class C. In the circuit of Fig. 2, the feedback path causes a D. C. voltage to be developed across resistor 15 which opposes the normally high negative grid bias. Thus, due to this opposition of the high negative grid bias the D. C. feedback path of Fig. 2 affects the operating characteristics of the tube 4' to the extent of constraining such tube to operate toward the class B limit, by an amount dependent upon the particular characteristics of the tube, the anode potential used, and the values assigned to resistors 6, 13 and 15 and capacitors 12 and 16. Operation of the tube 4' toward class B limits (class B being operation wherein the grid bias is approximately equal to the cutoff value, so that the anode current is approximately zero when no exciting grid voltage is applied and so that anode current in the tube flows for approximately one-half of each cycle when an alternating grid voltage is applied) reduces substantially the harmonic content of the waveform at the electrodes of tube 4', since class B operation involves less distortion or less harmonic content in the waveform than does class C operation. Of course, operation toward class B limits as a result of the D. C. feedback described involves a reduction in efficiency, as compared to class C operation.

Since the efficiency, and hence the oscillator output voltage available from the oscillator tank circuit 9 in Fig. 2, is now controlled at least partially by the D. C. feedback path, the A. C. or oscillatory output voltage is rendered more stable in amplitude. This effect is produced in the following way. A decrease in A. C. voltage at the grid 2 means a reduction of A. C. voltage across resistor 6, which means a reduction of the D. C. feedback bias voltage fed to grid 2 and a consequent return away from the class B limits, further into class C operation. This means an increase in efficiency, and therefore more A. C. voltage developed in the anode and grid circuits. Thus, the tendency toward decrease of the A. C. voltage is opposed or counteracted, increasing the stability of the output amplitude. The converse action is also true—that is, an increase in A. C. voltage at the grid 2 means an increase of A. C. voltage across resistor 6, an increase of the D. C. feedback bias voltage, a consequent decrease in efficiency (resulting from moving toward class B limits, from class C), and therefore less A. C. voltage developed in the anode and grid circuits.

The change in A. C. voltage at the grid 2, referred to in the preceding paragraph, could be the result of a change in the transconductance of the tube, a change in circuit component values, or a change in the anode supply voltage.

It may be seen, from the foregoing, that the D. C. feedback arrangement of this invention stabilizes and linearizes the operation of a crystal oscillator of the so-called Pierce type—that is, it reduces the harmonic content (reduces the distortion) of the output waveform of the oscillator, and increases the stability of the output amplitude of the oscillator.

In an oscillator built according to the invention of Fig. 2 and successfully tested, the amplitude variation of the oscillator output for a ±6% variation in the anode supply voltage was only .44 db, as compared to 1.2 db for the conventional (Fig. 1) oscillator, not utilizing the invention. The R. M. S. distortion in the oscillator output waveform, across the tank circuit 9 in Fig. 2, at a frequency of 200 kc., was about 47 db down, as compared to only about 40 db down for the Fig. 1 oscillator, not utilizing the invention. The tank circuit 9 quality factor "Q" was identical in each case.

What is claimed is:

1. In a crystal-stabilized oscillator including an electron discharge device having at least anode, cathode and grid electrodes, means coupling the piezoelectric crystal between said anode and grid electrodes, and a self-biasing resistor connected in series with said cathode electrode: means for rectifying a portion of the alternating current voltage developed across said resistor, and means for applying the rectified voltage thus produced to said grid electrode in such a direction as to oppose the bias provided thereon as a result of the direct current voltage drop across said resistor.

2. A crystal oscillator comprising an electron discharge device having at least anode, cathode and grid electrodes, means coupling the piezoelectric crystal between said anode and grid electrodes, an unbypassed resistor connected in series with said cathode electrode, means coupling said grid electrode to the end of said resistor remote from said cathode electrode, whereby said resistor serves as a self-biasing resistor for said device, means for rectifying a portion of the alternating current voltage developed across said resistor, and means for applying the rectified voltage thus produced to said grid electrode in such a direction as to oppose the bias provided thereon by said resistor.

3. In a crystal-stabilized oscillator including an electron discharge device having at least anode, cathode and grid electrodes, means coupling the piezoelectric crystal between said anode and grid electrodes, and a self-biasing resistor connected in series with said cathode electrode: means for rectifying a portion of the alternating current voltage developed across said resistor, means for filtering the rectified voltage, and means for applying the rectified and filtered output of said filtering means to said grid electrode in such a direction as to oppose the bias provided thereon as a result of the direct current voltage drop across said resistor.

4. A crystal oscillator comprising an electron discharge device having at least anode, cathode and grid electrodes, means coupling the piezoelectric crystal between said anode and grid electrodes, an unbypassed resistor connected in series with said cathode electrode, means coupling said grid electrode to the end of said resistor remote from said cathode electrode, whereby said resistor serves as a self-biasing resistor for said device, means for rectifying a portion of the alternating current voltage developed across said resistor, means for filtering the rectified voltage, and means for applying the rectified and filtered output of said filtering means to said grid electrode in such a direction as to oppose the bias provided thereon by said resistor.

5. A crystal oscillator comprising an electron discharge device having at least anode, cathode and grid electrodes, a piezoelectric crystal connected between said anode and grid electrodes, a resistor connected between said cathode electrode and one terminal of a source of unidirectional potential, means coupling said grid electrode to said one terminal, a rectifier coupled to said cathode electrode for providing a positive direct current output voltage proportional to the alternating current voltage developed across said resistor, and means for applying said output voltage to said grid electrode.

6. An oscillator in accordance with claim 5, wherein the last-named means includes a radio frequency choke.

7. A crystal oscillator comprising an electron discharge device having at least anode, cathode and grid electrodes, a piezoelectric crystal connected between said anode and grid electrodes, a resistor connected between said cathode electrode and one terminal of a source of unidirectional potential, means coupling said grid electrode to said one terminal, a rectifier coupled to said cathode electrode for providing a positive direct current output voltage proportional to the alternating current voltage developed across said resistor, filtering means receptive of said output voltage, and means for applying the output of said filtering means to said grid electrode through a choke presenting high impedance to radio frequency currents.

8. A crystal oscillator comprising an electron discharge device having at least anode, cathode and grid electrodes, a piezoelectric crystal connected between said anode and grid electrodes, a resistor connected between said cathode electrode and one terminal of a source of unidirectional potential, means coupling said grid electrode to said one terminal, a rectifier, capacitive means coupling said rectifier to said cathode electrode, said rectifier operating to provide a positive direct current output voltage proportional to the alternating current voltage developed across said resistor, and means for applying said output voltage to said grid electrode.

9. A crystal oscillator comprising an electron discharge device having at least anode, cathode and grid electrodes, a piezoelectric crystal connected between said anode and grid electrodes, a resistor connected between said cathode electrode and one terminal of a source of unidirectional potential, means coupling said grid electrode to said one terminal, a rectifier, capacitive means coupling said rectifier to said cathode electrode, said rectifier operating to provide a positive direct current output voltage proportional to the alternating current voltage developed across said resistor, filtering means receptive of said output voltage, and means for applying the output of said filtering means to said grid electrode.

10. An oscillator in accordance with claim 9, wherein the last-named means includes a radio frequency choke.

No references cited.